Sept. 23, 1947. T. H. THOMPSON 2,427,981
DRIVE AND PITCH CONTROL MECHANISM FOR HELICOPTER ROTORS
Filed Dec. 9, 1944 3 Sheets-Sheet 1

INVENTOR.
TOM H. THOMPSON
BY HIS ATTORNEYS
Howson and Howson

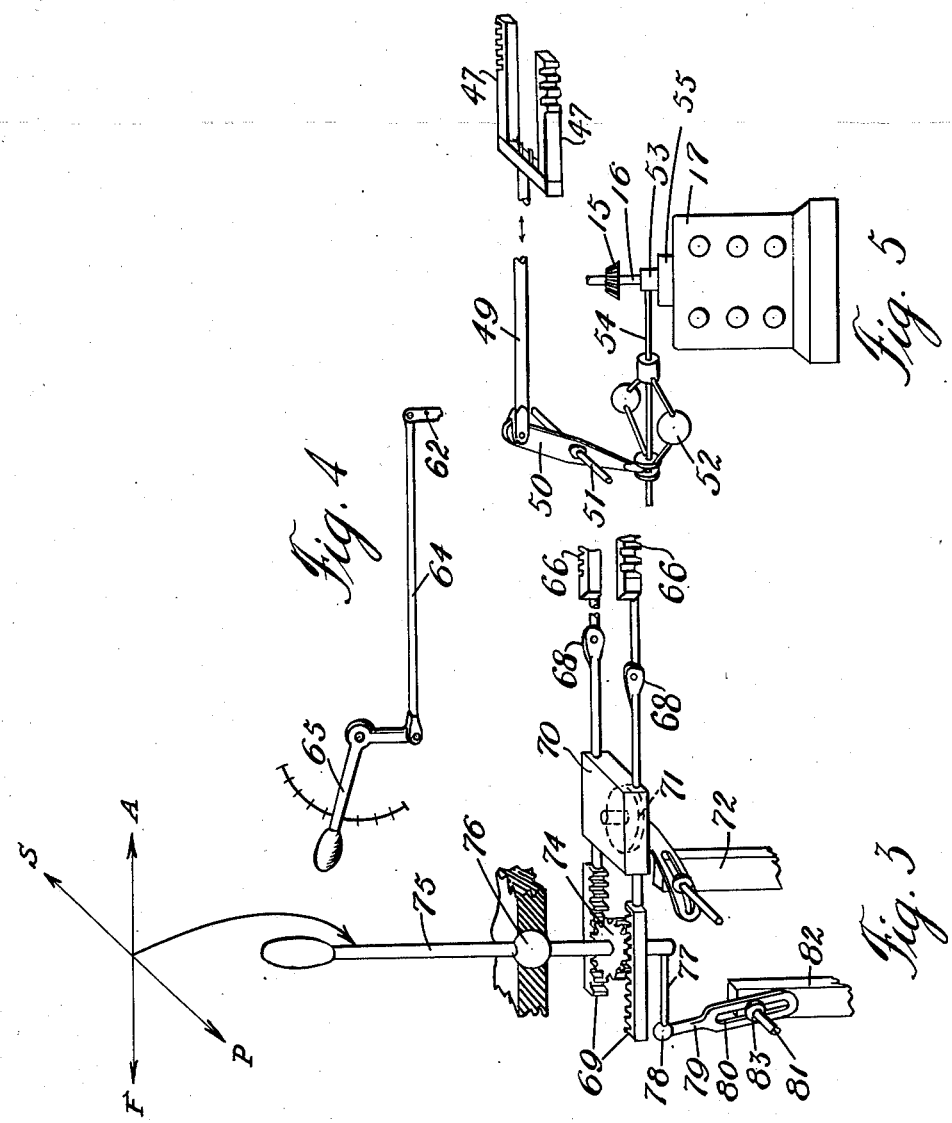

Patented Sept. 23, 1947

2,427,981

UNITED STATES PATENT OFFICE 2,427,981

DRIVE AND PITCH CONTROL MECHANISM FOR HELICOPTER ROTORS

Tom H. Thompson, Mamaroneck, N. Y., assignor to Thompson-Wade Corporation, Detroit, Mich., a corporation of Michigan Application December 9, 1944, Serial No. 567,397

14 Claims. (Cl. 244—17)

This invention relates to helicopters and more particularly, to means for controlling the helicopter rotors and it is an object of this invention to provide an improved controlling means for a helicopter having a plurality of angularly disposed rotors which shall permit of simultaneous control of both rotors and of disposing the blades so as to provide a lifting effect throughout the rotation of the blade.

In the drawings

Fig. 3 is a fragmentary view in elevation of the means for controlling the cyclic variation of the rotor blades;

Fig. 4 is a fragmentary view of the means controlling the extent of the cyclic variation of the rotor blades; and Fig. 5 is a view in elevation of the governing means for maintaining the rotor blades positioned for a predetermined speed of rotation.

Figure 1:
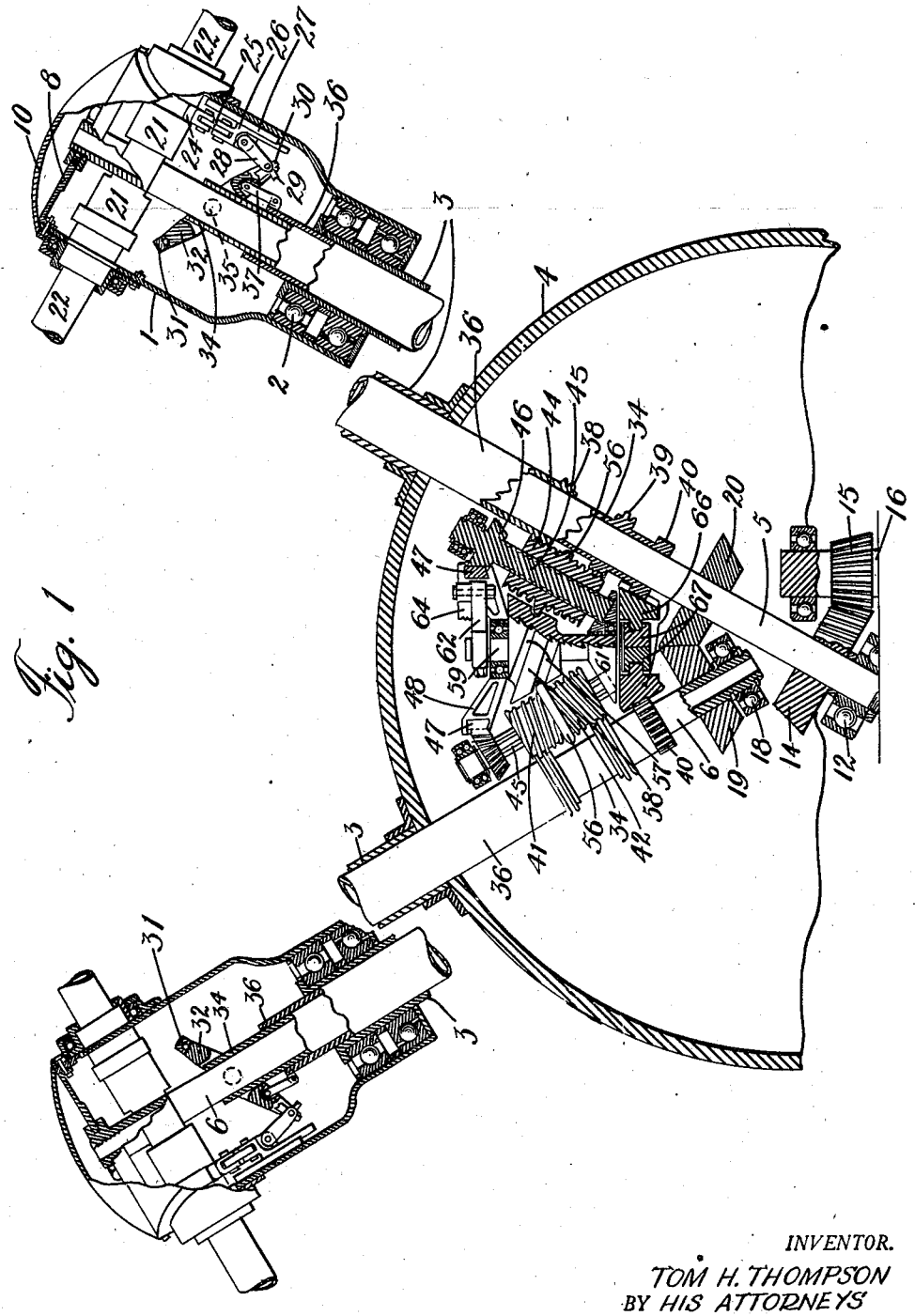
Fig. 1 is a broken partial view in vertical section of a helicopter having rotor controlling means in accordance with this invention.

In the drawings, helicopter rotor controlling means in accordance with this invention are shown in connection with rotor operating means such as are shown in my application Serial No. 556,033, filed September 27, 1944, of which application this application is a continuation-in-part. Such an operating means comprises a plurality of angularly disposed heads 1 rotatably mounted on bearings 2 carried by support tubes 3 fixedly mounted on the fuselage 4. The heads 1 are driven by angularly disposed shafts 5 and 6 respectively which, at their outer ends are attached to plates 8 secured to the outer ends of the heads 1 and covered by cap plates 10. The inner end of shaft 5 is journalled in a bearing 12 and has fixed thereon a gear 14 which meshes with a gear 15 on a shaft 16 driven by a suitable motor 17.

The shaft 6 is shorter than the shaft 5 and has its inner end supported in a bearing 18 adjacent the shaft 5 and is provided with a gear 19 which meshes with a gear 20 fixed on the shaft 5, the gearing being such that the shafts 5 and 6 rotate in opposite directions and at the same speed. Rotatably mounted in each head 1 is a plurality of radially arranged blade supporting sleeves 21 in which are secured the inner end portions of the rotor blades 22, the connection of the sleeves 21 and the rotor blades being such that rotation of the sleeves 21 about their longitudinal axes causes an equal rotation of the rotor blades about the longitudinal axes of the blades.

To rotate the sleeves 21 about their axes and thus vary the inclination of the rotor blades carried thereby each sleeve 21 is provided with an outwardly projecting arm 24 to which is pivotally connected one end of a link 25, the other end of which is pivotally connected to the upper end of a slide 26 mounted for reciprocation in guides 27 secured to the wall of the head 1. To the lower end of the slide 26 there is pivotally connected the upper end of a link 28, the lower end of which is connected by a gimbal joint 29 to a radially projecting lug 30 formed integral with a ring 31 which is rotatably mounted on the perimeter of a disk 32. The disks 32 surround the shafts 5 and 6, respectively, and tubes 34 which are slidably and rotatably mounted on these shafts and are provided with radially extending projections 35 on which the disks 32 are pivotally mounted. Slidably mounted between each tube 34 and the corresponding support tube 3 is a tube 36 of less length than the tube 34 and which, at its upper end has pivotally connected thereto one end of a link 37 the other end of which is pivotally connected to the disk 32.

The tubes 34 and 36 project beyond the tubes 3 into the body of the fuselage and, preferably, are secured together in any suitable manner so as to rotate together about the axis of the respective shafts 5 and 6. At its lower end each tube 36 is provided with a plurality of circular gear teeth 38 while each tube 34 is provided adjacent its lower end with similar circular gear teeth 39 and at its lower end with a gear 40. The gear teeth 38 and 39 are engaged by oppositely directed worm gears 41 and 42, respectively, on a worm member 44 which is slidably mounted on a rotatably mounted shaft 45 having a gear 46 fixed thereon. Each gear 46 is engaged by a rack bar 47 slidably mounted in suitable supports 48 and connected by a rod 49 to a lever 50 which is pivotally mounted as at 51, and operated by a governor 52. The governor 52 is rotated by a shaft 54 driven through suitable gearing 53 from the main drive shaft 16, there being a suitable over-running clutch 55 between the motor 17 and the gearing 53 so that in case of failure of the motor 17 the governor 52 is operated by continued rotation of the shaft 16.

Between the worm gears 41 and 42, each worm member 44 is provided with a circular gear tooth 56 which lies in a plane perpendicular to the axis of the shaft 45 and is engaged by a worm gear 57 on a worm member 58. The worm member 58 is fixed on a shaft 59 which is rotatably mounted in suitable supports 61 and has fixed to its upper end a lever arm 62. The lever arm 62 is connected by a rod 64 to a bell crank operating lever 65 positioned so as to be within easy reach of the operator and arranged to be retained in the position to which it is moved by the operator.

The gear 40 at the lower end of each tube 34 is engaged by a rack bar 66 the teeth of which are of sufficient width to remain engaged with the gear 40 throughout the movement of the tube 34 longitudinally of the respective shafts 5 and 6. The rack bars 66 are slidably supported in suitable guides 67 and are connected by rods 68 to rack bars 69. The rods 68 are guided by a guide plate 70 pivotally mounted on a supporting plate 71 carried by a suitable support 72. The rack bars 69 are held by the rods 68 in engagement with opposite sides of a gear 74 fixed on a control lever 75 which is pivotally mounted, as at 76, for movement in all directions. To the lower end of the control lever 75 there is attached a fixed arm 77 having at its outer end a ball and socket connection 78 with a member 79. The member 79 is provided with a slot 80 in which is engaged a bolt 81 having a nut 83 slidably connecting the member 79 to a support 82, the connection being such that the member 79 is limited to movement in a single plane. This limitation on the movement of the member 79 and its connection to the control lever 75 partially controls the movement of the control lever 75 so that while the control lever 75 is free to move directly forward or backward and move both rack bars 69 and rods 68 simultaneously in the same direction and equally, any movement of the control lever 75 to one side or the other causes the control lever to be rotated because of its connection to the member 79, thus rotating the gear 74 and causing the rack bars 69 at opposite sides of the gear 74 to be operated in opposite directions.

In the operation of the device, rotation of heads 1 by the shafts 5 and 6 rotates the sleeves 21 and the rotor blades 22 carried thereby. As the heads 1 and sleeves 21 rotate, the connections of the sleeves 21 and the slides 26 to the rings 31 cause the rings 31 to rotate about the disks 32 and any inclination of the disks 32 such as is illustrated in Fig. 1, causes a variation in the position of the sleeves 21 and the pitch of the rotor blades as the rings 31 are rotated about the disks 32. Relatively shifting longitudinally the tubes 34 and 36 varies the inclination of the disks 32 while by adjusting the disks 32 to lie in planes perpendicular to the axes of the shafts 5 and 6 the rotor blades may be given the same pitch throughout their revolution. With the disks in such a position, by shifting the tubes 34 and 36 simultaneously the same amount and in the same direction, the pitch of the rotor blades may be changed while maintaining the pitch constant throughout the complete revolution of the blades. With the disks 32 tilted rotating the tubes 34 and 36 rotates the disks 32 without changing the degree of inclination of the disks 32 and rotating the disks 32 changes the pitch of the rotor blades at different portions of their circles of revolution but does not change the maximum pitch of the rotor blades.

When the motor 17 is running and the rotor blades operated by the rotation of the drive shafts 5 and 6, operation of the governor 52 by the shaft 16 tends to operate the lever 50, rod 49 and rack bars 47 to rotate shafts 45 and worm members 44, operating the worms 41 and 42 to adjust the relative positions of the tubes 34 and 36 and the inclination of the disks 32 so as to maintain the rotor blades at a pitch which will permit the motor to maintain a predetermined speed of rotation of the rotor blades. Operating the lever 65 shifts the rod 64 to operate lever 62 and rotate worm member 58 which through its engagement with the circular gear teeth 56, shifts the worm member 44 bodily on the shaft 45 and the tubes 34 and 36 bodily on the shafts 5 and 6 while maintaining the relative positions of the tubes 34 and 36 on each drive shaft. Shifting the tubes 34 and 36 bodily changes the position of the disks 32 with respect to the sleeves 21 and thus changes the maximum and minimum pitch positions of the rotor blades during each revolution without changing the range through which the blades oscillate. This range, however, is subject to change by operation of the governor 52 and also, although indirectly by any change of the manual throttle control.

Operating the control lever 75 either directly forward or directly rearward shifts the rack bars 69, rods 68 and rack bars 66 simultaneously the same amount and in the same direction causing the tubes 34 and 36 on the shaft 5 to be rotated oppositely to the tubes 34 and 36 on the shaft 6 and causing the disks 32 to be rotated with their associated tubes 34 and 36. Rotating the disks 32 in opposite directions maintains a relation between the disks 32 such that the rotor blades driven by both shafts 5 and 6 operate to drive the helicopter in the same direction, that is, either forward or backward. The circular teeth 38 and 39 on the tubes 34 and 36 respectively, permit rotation of the tubes on the shafts 5 and 6 without causing relative displacement of the tubes longitudinally.

Operating the control lever 75 to one side or the other causes the lever 75, owing to its connection with the member 79, to be rotated thus operating the rack bars 69, rods 68 and rack bars 66 in opposite directions and causing the tubes on the shaft 5 to be rotated in the same direction as the tubes on the shaft 6. Rotation of the tubes in the same direction causes a like rotation of the disks 32 and establishes a relation of the disks 32 causing the rotor blades to drive the helicopter to one side or the other.

Figure 2:
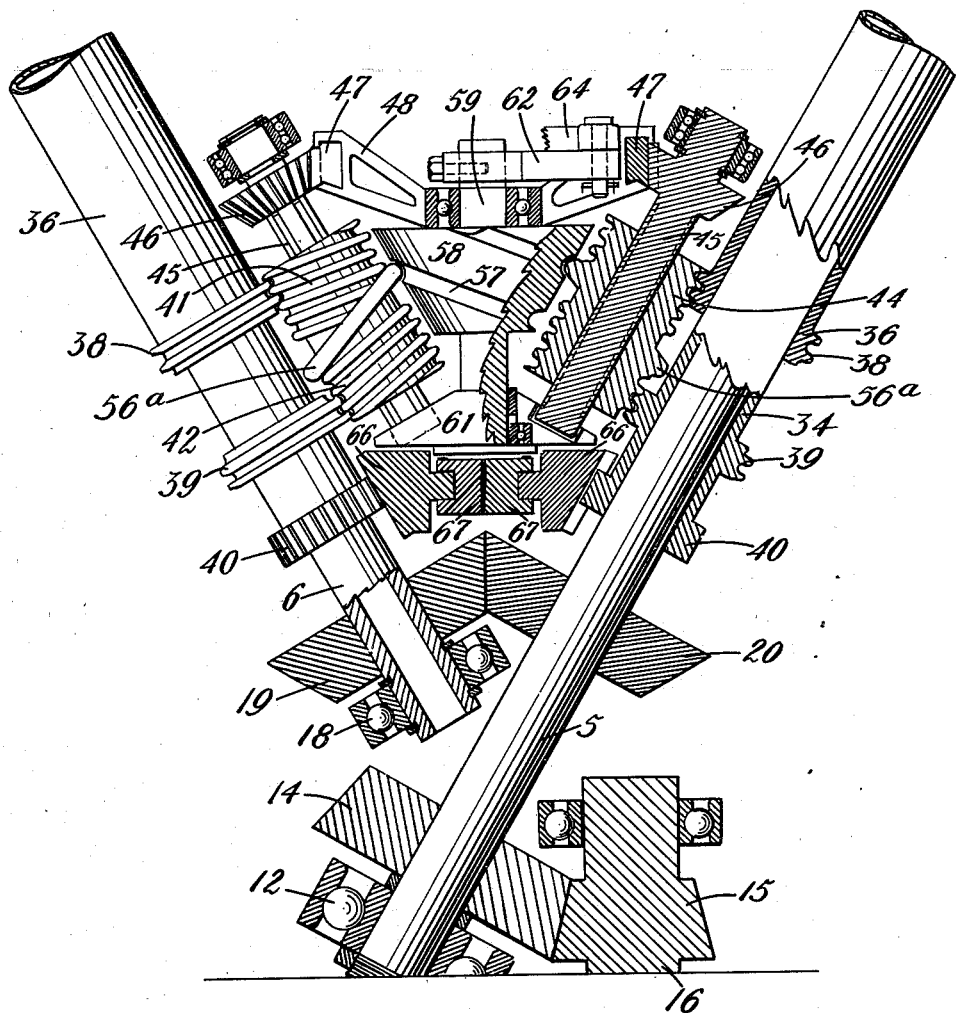
Fig. 2 is a fragmentary sectional view similar to Fig. 1 and showing a controlling means of modified construction.

While in the construction just described the worm member 44 is provided with a circular gear tooth 56 which lies in a plane perpendicular to the axis of the shaft 45 so that there is no longitudinal movement of the worm member 44 on the shaft 45 when the shaft 45 is rotated, each worm member 44 may be provided with a circular gear tooth 56a which, as shown in Fig. 2, lies in a plane which is not perpendicular to the axis of the shaft 45. Where the worm member 44 is provided with a circular gear tooth as shown in Fig. 2 the operation of the device by the control lever 75 and by the lever 65 is as previously described while the operation by the governor 52 and rack bars 47 is modified. With the construction shown in Fig. 2 operation of the worm members 44 by the rack bars 47 causes the worms 41 and 42 to effect a relative displacement of the tubes 34 and 36 and the circular gear tooth 56a causes the worm members 44 to be moved bodily on the shaft 45. Movement of the worm member 44 along the shaft 45 will increase the effect of the rotation of the worm member 44 as to one tube on each shaft and decrease its effect as to the other tube on each shaft. By varying the inclination of the teeth 56a a desired modification of the operation of the worm members 44 may be provided.

The manipulation of a helicopter equipped in accordance with this invention is as follows: with the engine running and warmed up to the proper temperature for flight, the throttle is set for the approximate demand to be experienced in the operation. If a fast rate of climb and a rapid transitional speed are desired, the throttle setting approaches a maximum while if a very slow rate of climb and low transitional speed are desired, the throttle setting approaches a minimum. With the throttle opened about half way, the lever 75 in neutral position and the lever 65 in a slow rate of climb position, this combination of throttle setting and mean pitch demand provides a considerable excess of power output by the engine and would result in speeding up the rotor blades beyond the predetermined revolutions per minute were it not for the cyclic pitch governor 52. The governor by increasing the cyclic pitch of the blades causes the excess power to be used. Despite the considerable cyclic pitch of the blades there is no transitional horizontal flight with the lever 75 in neutral position as the respective cyclic pitch azimuths of the two rotors are then in opposition and the machine ascends in response to the setting of the lever 65.

With the helicopter in the air, movement of the lever 75 directly forward or directly backward will set the cyclic pitch azimuths of the rotors in the position in which both rotors are urging the craft forward or both rotors are urging the craft backward, the governor providing the excess of power over what is necessary for operation of the rotors in accordance with the setting of the lever 65 for horizontal movement by adjusting the cyclic pitch of the blades. With the movement of the lever 75 to one side or the other the cyclic pitch azimuths of the rotors are set so both rotors urge the craft to the one side or the other.

For maximum transitional speed (not diving) the throttle is adjusted to the full open position, the lever 65 set for merely maintaining a given altitude while the lever 75 is moved to an extreme position, as the extreme forward position.

For the descent, where no transitional movement is desired, the lever 75 is placed in the neutral position where the cyclic pitch azimuths of the rotors are opposed to each other and the desired rate of descent secured by adjusting the position of the lever 65. The operation of the governor 52 will make available for transitional movement the excess of power over what is required to sustain the craft at the desired rate of descent and this condition will be maintained to full throttle opening if desired. When the ground is reached, the lever 65 is placed in neutral position and the craft remains on the ground without tending to move in any direction and without necessitating further manipulation of the controls to prevent undesired operation.

What is claimed is:

1. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, means for relatively displacing said tubes to vary the degree of inclination of the plane of said disk and unitary means for simultaneously shifting said tubes longitudinally in the same direction for varying the extreme positions of said blades while maintaining a constant range of oscillation of said blades.

2. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, means for relatively displacing said tubes to vary the degree of inclination of the plane of said disk and unitary means for shifting said tube displacing means for shifting said tubes longitudinally in the same direction simultaneously to bodily shift said disk while maintaining the inclination of the plane of said disk.

3. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, a worm member having worms engaging said tubes, means to operate said worm member for relatively displacing said tubes to vary the inclination of said disk and means for shifting said worm member to shift said tubes simultaneously longitudinally in the same direction to bodily shift said disk while maintaining the inclination of said disk.

4. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, a worm member having worms engaging said tubes, means to operate said worm member for relatively displacing said tubes to vary the inclination of said disk, a circular gear tooth on said worm member, a second worm member engaging said gear tooth and means for operating said second worm member to shift said first worm member and said tubes longitudinally to bodily shift said disk while maintaining the inclination of said disk.

5. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, a worm member having oppositely directed worms engaging said tubes, means for operating said worm member for relatively displacing said tubes to vary the inclination of said disk, a circular gear tooth on said worm member, a second worm member engaging said gear tooth and means for rotating said second worm member to bodily shift said first worm member, said tubes and said disk while maintaining the inclination of said disk.

6. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, a worm member having oppositely directed worms engaging said tubes, means for operating said worm member for relatively displacing said tubes to vary the inclination of said disk, a circular gear tooth on said worm member, a second worm member engaging said gear tooth, said gear tooth and second worm shifting said first worm bodily upon operation of said first worm, and means for rotating said second worm member to bodily shift said first worm member, said tubes and said disk while maintaining the inclination of said disk.

7. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, means for relatively displacing said tubes to vary the degree of inclination of the plane of said disk, unitary means for shifting said tube displacing means to shift said tubes longitudinally in the same direction and bodily shift said disk while maintaining the inclination of said disk, and means for rotating said disk to vary the direction of inclination thereof.

8. In a helicopter drive mechanism, a pair of drive shafts relatively angularly disposed, a common operating means for said drive shafts, blades operated from each of said drive shafts, means supporting said blades for oscillation about their longitudinal axes, a movably mounted support tube surrounding each of said drive shafts, a disk pivotally supported by each of said tubes, means connecting each disk and the blades operated by the associated drive shaft, a second tube surrounding each of said first tubes, means connecting said second tubes and the associated disks, means for relatively displacing said tubes on each of said shafts to vary the inclination of the planes of said disks and unitary means for simultaneously shifting said tube displacing means to shift said tubes and disks while maintaining the inclination of the planes of said disks.

9. In a helicopter drive mechanism, a pair of drive shafts relatively angularly disposed, a common operating means for said drive shafts, blades operated from each of said drive shafts, means supporting said blades for oscillation about their longitudinal axes, a movably mounted support tube surrounding each of said drive shafts, a disk pivotally supported by each of said tubes, means connecting each disk and the blades operated by the associated drive shaft, a second tube surrounding each of said first tubes, means connecting said second tubes and the associated disks, worm means for relatively displacing said tubes on each of said shafts to vary the inclination of the planes of said disks, means to simultaneously operate said worm means, and means for simultaneously shifting said worm means to shift said tubes and disks while maintaining the inclination of the planes of said disks.

10. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, means responsive to the speed of rotation of said drive shaft for relatively displacing said tubes to vary the degree of inclination of the plane of said disk, and means for simultaneously shifting said tubes longitudinally in the same direction for varying the extreme positions of said blades while maintaining a constant range of oscillation of said blades.

11. In a helicopter drive mechanism, a drive shaft, blades operated from said drive shaft, means supporting said blades for oscillation about the longitudinal axes of said blades, means responsive to the speed of rotation of said drive shaft for controlling the cyclic pitch of said blades and means for varying the mean pitch of said blades while maintaining the cyclic pitch of said blades.

12. In a helicopter drive mechanism, a drive shaft, blades operated from said drive shaft, means supporting said blades for oscillation about the longitudinal axes of said blades, means responsive to the speed of rotation of said drive shaft for controlling the cyclic pitch of said blades and manually operated means for varying the mean pitch of said blades while maintaining the cyclic pitch of said blades.

13. In a helicopter drive mechanism, a drive shaft, blades operated from said drive shaft, means supporting said blades for oscillation about the longitudinal axes of said blades, a movably mounted support tube surrounding said drive shaft, a disk pivotally supported by said tube, means connecting said disk and blades, a second tube surrounding said first tube, means connecting said second tube and disk, centrifugally operated means responsive to the speed of rotation of said drive shaft for relatively displacing said tubes to vary the degree of inclination of said disk and the cyclic pitch of said blades and manually operated means for simultaneously shifting said tubes longitudinally in the same direction for bodily shifting said disk for varying the extreme positions of said blades while maintaining constant the inclination of said disk and the range of oscillation of said blades.

14. In a helicopter drive mechanism, a drive shaft, blades operated from said drive shaft, means supporting said blades for oscillation about the longitudinal axes of said blades, means for operating said blades to provide a cyclic pitch for said blades, means responsive to the speed of rotation of said drive shaft for controlling the cyclic pitch of said blades, and means for varying the mean pitch of said blades while maintaining the cyclic pitch of said blades, said cyclic pitch blade operating means having means varying the mean pitch of said blades.

TOM H. THOMPSON.

REFERENCES CITED

The following references are of record in the file of this patent:

UNITED STATES PATENTS

| Number | Name | Date |
| --- | --- | --- |
| 1,900,689 | Baum | Mar. 7, 1933 |
| 2,256,635 | Young | Sept. 23, 1941 |

FOREIGN PATENTS

| Number | Country | Date |
| --- | --- | --- |
| 853,421 | France | Dec. 7, 1939 |